United States Patent
Ge et al.

(10) Patent No.: US 12,183,923 B2
(45) Date of Patent: Dec. 31, 2024

(54) CARBON-BASED ANODE MATERIAL HAVING SURFACE FORMED WITH SLIGHTLY OXIDIZED PORES, AND METHOD FOR PREPARING SAME

(71) Applicant: Guangdong Kaijin New Energy Technology Co., Ltd., Dongguan (CN)

(72) Inventors: Chuanchang Ge, Guangdong (CN); Yongjun Yang, Guangdong (CN)

(73) Assignee: Guangdong Kaijin New Energy Technology Co., Ltd., Dongguan (CN)

(*) Notice: Subject to any disclaimer, the term of this patent is extended or adjusted under 35 U.S.C. 154(b) by 583 days.

(21) Appl. No.: 17/535,583

(22) Filed: Nov. 25, 2021

(65) Prior Publication Data

US 2022/0190336 A1    Jun. 16, 2022

Related U.S. Application Data

(63) Continuation of application No. PCT/CN2021/080387, filed on Mar. 12, 2021.

(30) Foreign Application Priority Data

Dec. 11, 2020  (CN) .......................... 202011446779.1

(51) Int. Cl.
*H01M 4/62* (2006.01)
*H01M 4/583* (2010.01)
*H01M 10/0525* (2010.01)
*H01M 4/02* (2006.01)

(52) U.S. Cl.
CPC ........... *H01M 4/583* (2013.01); *H01M 4/622* (2013.01); *H01M 4/624* (2013.01); *H01M 10/0525* (2013.01); *H01M 2004/021* (2013.01)

(58) Field of Classification Search
CPC ..................................................... H01M 4/583
See application file for complete search history.

(56) References Cited

FOREIGN PATENT DOCUMENTS

CN          108352503 A    *    7/2018    ............... C09D 5/00

OTHER PUBLICATIONS

PE2E translation of CN 108352503 A (Year: 2018).*

* cited by examiner

*Primary Examiner* — Maria Laios
*Assistant Examiner* — Zackary Richard Cochenour
(74) *Attorney, Agent, or Firm* — Andrew C. Cheng

(57) ABSTRACT

A carbon-based anode material having a surface formed with slightly oxidized pores, includes by weight: 10-30 parts of clay minerals, 5-8 parts of chitosan, 0.1-1 part of a cationic polymer, 0.1-1 part of tris-1-(2-methylaziridinyl) phosphine oxide, 3-8 parts of a conductive agent, 3-8 parts of absolute ethyl alcohol, 1-3 parts of potassium oxalate, and 10-15 parts of a binder. According to the invention, the cationic polymer and the tris-1-(2-methylaziridinyl) phosphine oxide are added on the basis of the chitosan and the clay minerals, the cationic polymer contains polynuclear olation complex ions with a high positive electrovalence, thus being able to closely adhering to the surface of clay to form a three-dimensional net structure, so multiple slightly oxidized pores are formed in the surface of the obtained carbon-based material in a carbonization process, and the finally obtained carbon-based anode material has good charge-discharge performance and cycle performance.

10 Claims, No Drawings

CARBON-BASED ANODE MATERIAL HAVING SURFACE FORMED WITH SLIGHTLY OXIDIZED PORES, AND METHOD FOR PREPARING SAME

FIELD

The invention relates to the technical field of battery materials, in particular to a carbon-based anode material having a surface formed with slightly oxidized pores, and a method for preparing the same.

BACKGROUND

Compared with traditional secondary batteries, lithium ion batteries have the advantages of high energy density, high operating voltage, high safety, low environmental pollution, and the like. Wherein, anode materials, as the main part for lithium storage of lithium ion batteries, can realize intercalation and removal of lithium ions in the charge-discharge process, and are the key to improve the total specific capacity, cycle performance, and charge-discharge performance of the lithium ion batteries. Of all anode materials, carbon-based anode materials have always taken a leading role. Most lithium ion batteries on sale adopt graphitized carbon-based anode materials. However, due to the fact that the theoretical specific capacity of graphite is only 372 mAh/g, the performance of the lithium ion batteries is severely limited. So, the development of a novel carbon-based anode material with a high specific capacity has become a research focus.

In recent years, with the constant deepening of the study on carbon materials, researchers have found that the specific capacity of lithium ion batteries can be greatly improved by carrying out surface modification and structural adjustment on graphite and carbon materials, or disordering graphite parts, or forming nano-pores, nano-holes or nano-channels in carbon materials.

Chitosan is a non-toxic macromolecular polymer obtained by removing N-acetyl from natural chitin, and a large number of active coordinating groups such as hydroxyl, amino, acetamido, furan rings and oxygen bridges are contained in the molecular chain of the chitosan.

Clay minerals are grains in clay and clay rock, typically refer to aqueous aluminum-ferrous-magnesium silicate minerals of a layered structure, and include kandite, smectite, vermiculite, clay-grade mica, illite, glauconite, chlorite, swelling chlorite, and relating minerals of a mixed-layer structure. The clay minerals are natural, easily available and low in price, have a small influence on the water environment, possess a large specific surface area and high surface activity, and contain a large number of exchangeable positive ions on the surface and between different layers.

Thus, a carbon-based anode material with a high specific capacity obtained by combining the advantages of chitosan and the advantages of clay minerals has a broad application prospects.

SUMMARY

To overcome the defects of the prior art, the invention provides a carbon-based anode material having a surface formed with slightly oxidized pores, which is a low-cost and environmentally-friendly hard carbon-based anode material with good electrochemical properties prepared from chitosan and clay materials by a carbonization process by means of the advantages of chitosan and the advantages of clay materials.

The invention further provides a method for preparing the carbon-based anode material having a surface formed with slightly oxidized pores.

The invention is implemented by means of the following technical solution:

A carbon-based anode material having a surface formed with slightly oxidized pores, comprising by weight:
  10-30 parts of clay minerals, 5-8 parts of chitosan, 0.1-1 part of a cationic polymer, 0.1-1 part of tris-1-(2-methylaziridinyl) phosphine oxide, 3-8 parts of conductive agent, 3-8 parts of absolute ethyl alcohol, 1-3 parts of potassium oxalate, and 10-15 parts of a binder.

Preferably, the clay minerals comprise bentonite, vermiculite and kieselguhr, a mass ratio of which is 7:10-15:5-8.

Preferably, the cationic polymer is one or a combination of hydroxyl aluminium and hydroxyl zirconium.

Preferably, a mass ratio of the clay minerals, the chitosan and the cationic polymer is 2-3:1:0.1-0.2.

In another aspect, the present invention provides a method for preparing a carbon-based anode material having a surface formed with slightly oxidized pores, comprising the following steps:
  S1: placing clay minerals in a three-necked bottle, adding water to prepare a suspension liquid, adding a nitric acid solution for activation, and regulating pH to 4-6; sequentially adding a cationic polymer and tris-1-(2-methylaziridinyl) phosphine oxide into the three-necked bottle containing the clay minerals, and stirring at indoor temperature for reaction; then, adding chitosan, stirring in a thermostatic water bath at 100° C.-120° C. for reaction, then cooling to the indoor temperature, carrying out extraction filtration, and washing with water until the pH is neutral, so that a mixed liquor is obtained;
  S2: placing, under the protection of an inert gas, the mixed liquor into a high-temperature heating furnace for carbonization treatment, so that a carbon-based material having a surface formed with slightly oxidized pores is obtained; and
  S3: mixing the carbon-based material having a surface formed with slightly oxidized pores with a conductive agent to form a mixture, then grinding the mixture, dispersing the ground mixture into absolute ethyl alcohol, adding a binder and potassium oxalate, and evenly stirring, drying and tabletting to obtain a carbon-based anode material having a surface formed with slightly oxidized pores.

Preferably, in S1, a mass concentration of the suspension liquid is 4%, and a mass concentration of the nitric acid solution is 1%.

Preferably, in S1, a time for stirring at the indoor temperature for reaction is 4 h-5 h, and a time for stirring in the thermostatic water bath for reaction is 4 h-5 h.

Preferably, in S2, the inert gas is nitrogen or argon.

Preferably, in S2, a temperature for the carbonization treatment is 600° C.-800° C., a pressure is 30 MPa-50 MPa, and a reaction time is 10 h-20 h.

Preferably, in S3, a mass ratio of the carbon-based material having a surface formed with slightly oxidized pores, and the conductive agent is 3-4:0.3-0.5.

Compared with the prior art, the invention has the following beneficial effects:

The present invention takes the advantages of the chitosan and the clay minerals, the cationic polymer and the tris-1-(2-methylaziridinyl) phosphine oxide are added on the basis of the chitosan and the clay minerals, the hydroxyl aluminum and hydroxyl zirconium of the cationic polymer are polynuclear olation complex ions with a high positive electrovalence, thus being able to closely adhering to the surface of the clay, and a three-dimensional net structure is formed by coordination of hydroxyl and the chitosan, so multiple slightly oxidized pores are formed in the surface of the obtained carbon-based material by means of oxides and gases generated by the cationic polymer at a high temperature in a carbonization process, and the finally obtained carbon-based anode material having a surface formed with slightly oxidized pores has good charge-discharge performance and cycle performance.

DESCRIPTION OF THE EMBODIMENTS

Below, the invention will be further described in conjunction with specific embodiments. It should be noted that the embodiments or technical features described below may be randomly combined to obtain new embodiments without contradictions.

Embodiment 1

A carbon-based anode material having a surface formed with slightly oxidized pores comprises by weight:
  10 parts of clay minerals, 5 parts of chitosan, 0.1 parts of a cationic polymer, 0.1 parts of tris-1-(2-methylaziridinyl) phosphine oxide, 3 parts of a conductive agent, 3 parts of absolute ethyl alcohol, 1 part of potassium oxalate, and 10 parts of a binder.
  Wherein, the clay minerals comprise bentonite, vermiculite and kieselguhr, the mass ratio of which is 7:10:5; the cationic polymer is hydroxyl aluminum; and the conductive agent is acetylene black.
  The carbon-based anode material having a surface formed with slightly oxidized pores is prepared through the following steps:
    S1: the clay minerals are placed in a three-necked bottle, water is added to prepare a suspension liquid with a mass concentration of 4%, a nitric acid solution with a mass concentration of 1% is added, and pH is regulated to 4-6; then, the cationic polymer and the tris-1-(2-methylaziridinyl) phosphine oxide are sequentially added into the three-necked bottle containing the clay minerals and stirred at indoor temperature for reaction for 4 h-5 h; then the chitosan is added, stirred in a thermostatic water bath at 100° C.-120° C. for 4 h-5 h, and cooled to the indoor temperature, then extraction filtration is carried out, and washing is carried out with water until the pH is neutral, so that a mixed liquor is obtained;
    S2: under the protection of nitrogen, the mixed liquor is placed in a high-temperature heating furnace, and carbonization treatment is carried out for 10 h-20 h under a temperature of 600° C.-800° C. and a pressure of 30 MPa-50 MPa, so that a carbon-based material having a surface formed with slightly oxidized pores is obtained; and
    S3: the carbon-based material having a surface formed with slightly oxidized pores is mixed with the conductive agent, an obtained mixture is ground and then dispersed in the absolute ethyl alcohol, and then the binder and the potassium oxalate are added and are evenly stirred, dried and tabletted, so that the carbon-based anode material having a surface formed with slightly oxidized pores is obtained.
  By testing, when the carbon-based anode material having a surface formed with slightly oxidized pores is used as a anode material for lithium ion batteries, the specific discharge capacity after a first charge-discharge cycle is 901 mAh/g, the first charge-discharge efficiency is 86.9%, and the capacity retention rate after 100 cycles is 95.8%.

Embodiment 2

A carbon-based anode material having a surface formed with slightly oxidized pores comprises by weight:
  20 parts of clay minerals, 6 parts of chitosan, 0.5 parts of a cationic polymer, 0.5 parts of tris-1-(2-methylaziridinyl) phosphine oxide, 6 parts of a conductive agent, 6 parts of absolute ethyl alcohol, 2 part of potassium oxalate, and 12 parts of a binder.
  Wherein, the clay minerals comprise bentonite, vermiculite and kieselguhr, the mass ratio of which is 7:10:5; the cationic polymer is hydroxyl aluminum; and the conductive agent is acetylene black.
  The carbon-based anode material having a surface formed with slightly oxidized pores is prepared through the following steps:
    S1: the clay minerals are placed in a three-necked bottle, water is added to prepare a suspension liquid with a mass concentration of 4%, a nitric acid solution with a mass concentration of 1% is added, and pH is regulated to 4-6; then, the cationic polymer and the tris-1-(2-methylaziridinyl) phosphine oxide are sequentially added into the three-necked bottle containing the clay minerals and stirred at indoor temperature for reaction for 4 h-5 h; then the chitosan is added, stirred in a thermostatic water bath at 100° C.-120° C. for 4 h-5 h, and cooled to the indoor temperature, then extraction filtration is carried, and washing is carried out with water until the pH is neutral, so that a mixed liquor is obtained;
    S2: under the protection of nitrogen, the mixed liquor is placed in a high-temperature heating furnace, and carbonization treatment is carried out for 10 h-20 h under a temperature of 600° C.-800° C. and a pressure of 30 MPa-50 MPa, so that a carbon-based material having a surface formed with slightly oxidized pores is obtained; and
    S3: the carbon-based material having a surface formed with slightly oxidized pores is mixed with the conductive agent, an obtained mixture is ground and then dispersed in the absolute ethyl alcohol, and then the binder and the potassium oxalate are added and are evenly stirred, dried and tabletted, so that the carbon-based anode material having a surface formed with slightly oxidized pores is obtained.
  By testing, when the carbon-based anode material having a surface formed with slightly oxidized pores is used as a anode material for lithium ion batteries, the specific discharge capacity after a first charge-discharge cycle is 910 mAh/g, the first charge-discharge efficiency is 90.4%, and the capacity retention rate after 100 cycles is 97.3%.

Embodiment 3

A carbon-based anode material having a surface formed with slightly oxidized pores comprises by weight:

30 parts of clay minerals, 8 parts of chitosan, 1 part of a cationic polymer, 1 part of tris-1-(2-methylaziridinyl) phosphine oxide, 8 parts of a conductive agent, 8 parts of absolute ethyl alcohol, 3 parts of potassium oxalate, and 15 parts of a binder.

Wherein, the clay minerals comprise bentonite, vermiculite and kieselguhr, the mass ratio of which is 7:10:5; the cationic polymer is hydroxyl aluminum; and the conductive agent is acetylene black.

The carbon-based anode material having a surface formed with slightly oxidized pores is prepared through the following steps:

S1: the clay minerals are placed in a three-necked bottle, water is added to prepare a suspension liquid with a mass concentration of 4%, a nitric acid solution with a mass concentration of 1% is added, and pH is regulated to 4-6; then, the cationic polymer and the tris-1-(2-methylaziridinyl) phosphine oxide are sequentially added into the three-necked bottle containing the clay minerals and stirred at indoor temperature for reaction for 4 h-5 h; then the chitosan is added, stirred in a thermostatic water bath at 100° C.-120° C. for 4 h-5 h, and cooled to the indoor temperature, then extraction filtration is carried out, and washing is carried out with water until the pH is neutral, so that a mixed liquor is obtained;

S2: under the protection of nitrogen, the mixed liquor is placed in a high-temperature heating furnace, and carbonization treatment is carried out for 10 h-20 h under a temperature of 600° C.-800° C. and a pressure of 30 MPa-50 MPa, so that a carbon-based material having a surface formed with slightly oxidized pores is obtained; and S3: the carbon-based material having a surface formed with slightly oxidized pores is mixed with the conductive agent, an obtained mixture is ground and then dispersed in the absolute ethyl alcohol, and then the binder and the potassium oxalate are added and are evenly stirred, dried and tabletted, so that the carbon-based anode material having a surface formed with slightly oxidized pores is obtained.

By testing, when the carbon-based anode material having a surface formed with slightly oxidized pores is used as a anode material for lithium ion batteries, the specific discharge capacity after a first charge-discharge cycle is 930 mAh/g, the first charge-discharge efficiency is 95.4%, and the capacity retention rate after 100 cycles is 96.6%.

Embodiment 4

A carbon-based anode material having a surface formed with slightly oxidized pores comprises by weight:

25 parts of clay minerals, 6 parts of chitosan, 0.5 parts of a cationic polymer, 1 part of tris-1-(2-methylaziridinyl) phosphine oxide, 8 parts of a conductive agent, 8 parts of absolute ethyl alcohol, 3 parts of potassium oxalate, and 15 parts of a binder.

Wherein, the clay minerals comprise bentonite, vermiculite and kieselguhr, the mass ratio of which is 7:10:5; the cationic polymer is hydroxyl aluminum; and the conductive agent is acetylene black.

The carbon-based anode material having a surface formed with slightly oxidized pores is prepared through the following steps:

S1: the clay minerals are placed in a three-necked bottle, water is added to prepare a suspension liquid with a mass concentration of 4%, a nitric acid solution with a mass concentration of 1% is added, and pH is regulated to 4-6; then, the cationic polymer and the tris-1-(2-methylaziridinyl) phosphine oxide are sequentially added into the three-necked bottle containing the clay minerals and stirred at indoor temperature for reaction for 4 h-5 h; then the chitosan is added, stirred in a thermostatic water bath at 100° C.-120° C. for 4 h-5 h, and cooled to the indoor temperature, then extraction filtration is carried out, and washing is carried out with water until the pH is neutral, so that a mixed liquor is obtained;

S2: under the protection of nitrogen, the mixed liquor is placed in a high-temperature heating furnace, and carbonization treatment is carried out for 10 h-20 h under a temperature of 600° C.-800° C. and a pressure of 30 MPa-50 MPa, so that a carbon-based material having a surface formed with slightly oxidized pores is obtained; and S3: the carbon-based material having a surface formed with slightly oxidized pores is mixed with the conductive agent, an obtained mixture is ground and then dispersed in the absolute ethyl alcohol, and then the binder and the potassium oxalate are added and are evenly stirred, dried and tabletted, so that the carbon-based anode material having a surface formed with slightly oxidized pores is obtained.

By testing, when the carbon-based anode material having a surface formed with slightly oxidized pores is used as a anode material for lithium ion batteries, the specific discharge capacity after a first charge-discharge cycle is 922 mAh/g, the first charge-discharge efficiency is 93.5%, and the capacity retention rate after 100 cycles is 94.9%.

Contrastive Example 1

A carbon-based anode material having a surface formed with slightly oxidized pores comprises by weight:

30 parts of clay minerals, 8 parts of chitosan, 1 part of tris-1-(2-methylaziridinyl) phosphine oxide, 8 parts of a conductive agent, 8 parts of absolute ethyl alcohol, 3 parts of potassium oxalate, and 15 parts of a binder.

Wherein, the clay minerals comprise bentonite, vermiculite and kieselguhr, the mass ratio of which is 7:10:5; and the conductive agent is acetylene black.

The carbon-based anode material having a surface formed with slightly oxidized pores is prepared through the following steps:

S1: the clay minerals are placed in a three-necked bottle, water is added to prepare a suspension liquid with a mass concentration of 4%, a nitric acid solution with a mass concentration of 1% is added, and pH is regulated to 4-6; then, the tris-1-(2-methylaziridinyl) phosphine oxide is added into the three-necked bottle containing the clay minerals and stirred at indoor temperature for reaction for 4 h-5 h; then the chitosan is added, stirred in a thermostatic water bath at 100° C.-120° C. for 4 h-5 h, and cooled to the indoor temperature, then extraction filtration is carried out, and washing is carried out with water until the pH is neutral, so that a mixed liquor is obtained;

S2: under the protection of nitrogen, the mixed liquor is placed in a high-temperature heating furnace, and carbonization treatment is carried out for 10 h-20 h under a temperature of 600° C.-800° C. and a pressure of 30 MPa-50 MPa, so that a carbon-based material having a surface formed with slightly oxidized pores is obtained; and S3: the carbon-based material having a surface formed with slightly oxidized pores is mixed with the conductive agent, an obtained mixture is ground and then dispersed in the absolute ethyl alcohol, and then the binder and the potassium oxalate are added and are evenly stirred, dried and tabletted, so that the carbon-based anode material having a surface formed with slightly oxidized pores is obtained.

By testing, when the carbon-based anode material having a surface formed with slightly oxidized pores is used as a anode material for lithium ion batteries, the specific discharge capacity after a first charge-discharge cycle is 670 mAh/g, the first charge-discharge efficiency is 76.4%, and the capacity retention rate after 100 cycles is 79.1%.

The above embodiments are merely preferred ones of the invention, and are not intended to limit the protection scope of the invention. Any non-substantive variations and substitutions made by those skilled in the art on the basis of the invention should fall within the protection scope of the invention.

What is claimed is:

1. A carbon-based anode material having a surface formed with oxidized pores, comprising by weight:
   10-30 parts of clay minerals, 5-8 parts of chitosan, 0.1-1 part of a cationic polymer,
   0.1-1 part of tris-1-(2-methylaziridinyl) phosphine oxide, 3-8 parts of a conductive agent, 3-8 parts of absolute ethyl alcohol, 1-3 parts of potassium oxalate, and 10-15 parts of a binder.

2. The carbon-based anode material having a surface formed with oxidized pores according to claim 1, wherein the clay minerals comprise bentonite, vermiculite and kieselguhr, a mass ratio of which is 7:10-15:5-8.

3. The carbon-based anode material having a surface formed with oxidized pores according to claim 1, wherein the cationic polymer is one or a combination of hydroxyl aluminium and hydroxyl zirconium.

4. The carbon-based anode material having a surface formed with oxidized pores according to claim 1, wherein a mass ratio of the clay minerals, the chitosan and the cationic polymer is 2-3:1:0.1-0.2.

5. A method for preparing the carbon-based anode material having a surface formed with oxidized pores according to claim 1, comprising:
   S1: placing clay minerals in a three-necked bottle, adding water to prepare a suspension liquid, adding a nitric acid solution for activation, and regulating pH to 4-6;
   sequentially adding a cationic polymer and tris-1-(2-methylaziridinyl) phosphine oxide into the three-necked bottle containing the clay minerals, and stirring at indoor temperature for reaction; then, adding chitosan, stirring in a thermostatic water bath at 100° C.-120° C. for reaction, then cooling to the indoor temperature, carrying out extraction filtration, and washing with water until the pH is neutral, so that a mixed liquor is obtained;
   S2: placing, under the protection of an inert gas, the mixed liquor into a high-temperature heating furnace for carbonization treatment, so that a carbon-based material having a surface formed with oxidized pores is obtained; and
   S3: mixing the carbon-based material having a surface formed with oxidized pores with a conductive agent to obtain a mixture, then grinding the mixture, dispersing the ground mixture into absolute ethyl alcohol, adding a binder and potassium oxalate, and evenly stirring, drying and tabletting to obtain the carbon-based anode material having a surface formed with oxidized pores.

6. The method for preparing the carbon-based anode material having a surface formed with oxidized pores according to claim 5, wherein in S1, a mass concentration of the suspension liquid is 4%, and a mass concentration of the nitric acid solution is 1%.

7. The method for preparing the carbon-based anode material having a surface formed with oxidized pores according to claim 5, wherein in S1, a time for stirring at the indoor temperature for reaction is 4 h-5 h, and a time for stirring in the thermostatic water bath for reaction is 4 h-5 h.

8. The method for preparing the carbon-based anode material having a surface formed with oxidized pores according to claim 5, wherein in S2, the inert gas is nitrogen or argon.

9. The method for preparing the carbon-based anode material having a surface formed with oxidized pores according to claim 5, wherein in S2, a temperature for the carbonization treatment is 600° C.-800° C., a pressure is 30 MPa-50 MPa, and a reaction time is 10 h-20 h.

10. The method for preparing the carbon-based anode material having a surface formed with oxidized pores according to claim 5, wherein in S3, a mass ratio of the carbon-based material having a surface formed with oxidized pores, and the conductive agent is 3-4:0.3-0.5.

* * * * *